United States Patent
Stephens et al.

(10) Patent No.: US 6,514,305 B2
(45) Date of Patent: Feb. 4, 2003

(54) MODULAR POWDER COATING BOOTH

(75) Inventors: John W. Stephens, Columbia Station, OH (US); Donald L. Urig, Elyria, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/100,832

(22) Filed: Mar. 18, 2002

(65) Prior Publication Data

US 2002/0095917 A1 Jul. 25, 2002

Related U.S. Application Data

(62) Division of application No. 09/558,504, filed on Apr. 26, 2000, now Pat. No. 6,419,720.

(51) Int. Cl.⁷ ................................................. B01D 35/30
(52) U.S. Cl. ............................ 55/413; 55/467; 55/484; 55/DIG. 46
(58) Field of Search ........................... 55/410, 413, 414, 55/467, 484, DIG. 18, DIG. 46

(56) References Cited

U.S. PATENT DOCUMENTS

| | | | |
|---|---|---|---|
| 4,704,953 A | * 11/1987 | Wilson | ....................... 118/326 |
| 4,871,380 A | 10/1989 | Meyers | |
| 4,928,624 A | 5/1990 | Overton, Jr. | |
| 5,261,934 A | 11/1993 | Shutic et al. | |
| 5,306,332 A | 4/1994 | Allen | |
| 5,586,861 A | * 12/1996 | Berger | ........................ 415/118 |
| 5,788,728 A | 8/1998 | Solis et al. | |

FOREIGN PATENT DOCUMENTS

DE 003406464 A1 9/1985

OTHER PUBLICATIONS

Nordson Corporation Brochure No. PWL–99–505, Jun. 1999, titled Econo–Coat® Series II Powder Coating System.
Nordson Corporation Brochure No. PWL–98–745, Jan. 1998, titled Versa–Coat® Batch and Conveyor Booths.
Nordson Corporation Manual No. 38–10, Apr., 1995.

* cited by examiner

*Primary Examiner*—Robert A. Hopkins
(74) *Attorney, Agent, or Firm*—Calfee, Halter & Griswold LLP

(57) ABSTRACT

A modular powder recovery apparatus includes a base unit, one or more cartridge filters, and a wrapper that at least partially encloses the cartridge filters. The wrapper is designed to allow additional wrappers to be vertically stacked thereon to increase the overall height of the wrapper, thus permitting additional filter capacity without changing the base unit. A modular cartridge assembly is provided to facilitate color change operations. A fan cone is provided in the base unit to permit fan wheel size changes without requiring structural modifications to the base unit housing.

3 Claims, 7 Drawing Sheets

MODULAR POWDER COATING BOOTH

TECHNICAL FIELD OF THE INVENTION

This application is a division of patent application Ser. No. 09/558,504, filed Apr. 26, 2000, now U.S. Pat. No. 6,419,720.

The present invention relates generally to spray booths for powder spraying applications. More particularly, the invention relates to powder collection and containment systems used with powder spray booths.

BACKGROUND OF THE INVENTION

Powder spraying is often used to apply a powder coating material to an article. Various spray technologies may be used including many electrostatic and non-electrostatic techniques. In most powder spraying operations, a significant amount of powder overspray is produced, meaning powder that is directed at the article but does not adhere to the article. Even with spray technologies that have a high transfer ratio, significant amounts of powder overspray may be produced.

The presence of powder overspray typically necessitates the use of a spray booth. A spray booth is used to contain or confine the powder overspray within a partially enclosed area. The spray booth may also be equipped with powder collection and recovery systems. Powder containment and collection are especially important for manual spraying operations wherein an operator is usually in relatively close proximity to the powder spray.

Spray booths can vary substantially in size depending on the articles being sprayed and the quantity of articles being sprayed. Some spray booths are conveyorized to permit automatic transfer of the articles into and through the booth.

A known spray booth design for containing and recovering powder uses cartridge filters and containment airflow. Such a system is sold by NORDSON® Corporation, Amherst, Ohio under the name ECONO-COAT® and VERSA-COAT® powder coating systems. The powder recovery system includes a series of vertically oriented cartridge style filters along one or more walls of the spray booth. A fan is used to create a substantial airflow within the booth. This airflow entrains the powder overspray. The fan draws the powder-laden air through the cartridge filters and exhausts the filtered air to the plant through a second set of filters called final filters. Powder collects on the cartridges, and the cartridges may be cleaned by applying a reverse pulse of air that knocks the powder off the cartridges to the collector base or booth floor. The motor fan, final filters and cartridge filters are assembled into a sealed housing to form a powder recovery module that can be mounted to a spray booth.

A significant limitation of such known systems, however, is that each powder recovery module is uniquely designed for a specific spray booth size. For example, for a given size booth, a fan and associated fan drive motor is used to produce an adequate air flow to contain the powder and draw the powder entrained air into the filters. The number and size of the cartridge filters are also determined by the size of the spray booth and required airflow to contain and recover the powder. Thus, for a given size spray booth, a powder recovery module is designed and fixed in terms of its air handling capacity. Although it is possible to add more modules for larger booths, this technique is not particularly efficient for smaller increases in spray booth size.

Another limitation of the known cartridge type recovery system is that to make a color change requires an extensive cleaning operation. While the filters are easy to replace, the associated housing and wrappers need to be cleaned prior to using a new powder color in the booth.

The need exists therefore for a more flexible and preferably modular cartridge-type powder recovery system that can have capacity added as the spray booth size increases. Such a design preferably will facilitate, if required, efficient color change operations.

SUMMARY OF THE INVENTION

In accordance with the invention, a powder recovery apparatus for a spray booth is provided that is modular in design to facilitate modifying the apparatus for increased or decreased air and filter capacity when the associated spray booth volume is changed. The modular design includes a base housing that encloses a motor driven fan wheel and one or more final or secondary filters. Vertically mounted on the base are one or more cartridge-style filters through which powder-laden air is drawn down into the base from the spray booth. In accordance with one aspect of the invention, the cartridges are partially surrounded by a wrapper that extends vertically to a height just above the cartridges. The wrapper is constructed such that additional wrappers may be vertically stacked to accommodate larger cartridges without having to modify the base. When the spray booth is increased in size, a larger motor and fan wheel or additional final filters may be installed when necessary in the same modular base.

In accordance with another aspect of the invention, the cartridge filters are arranged within a modular wrapper structure that is installed as a complete unit in a base. The modular cartridge assembly thus facilitates faster and easier color changes.

Still a farther aspect of the invention provides a fan cone in the base between the fan wheel and the air inlets to the base from the cartridges. The fan cone provides a transition air flow path such that the size of the fan wheel can be changed and easily interfaced to the air inlet without having to modify the base structure.

These and other aspects of the present invention will be fully explained and understood from the following detailed description of exemplary embodiments of the invention in view of the accompanying drawings.

BRIEF DESCRIPTION OF THE DRAWINGS

With reference to FIG. 1, an embodiment of a modular powder recovery apparatus 10 is illustrated. Although the invention is shown and described herein with reference to specific configurations of the powder recovery apparatus and spray booths, including size and shape, such descriptions are intended to be exemplary in nature and should not be construed in a limiting sense. Those skilled in the art will readily appreciate that the present invention may be realized in many different forms and configurations of spray booths, cartridge fillers and so forth. The present invention is more broadly directed to the idea of providing a modular powder recovery apparatus that can be easily modified to accommodate different airflow and powder filtering requirements when the associated spray booth size is changed.

Figure 1:
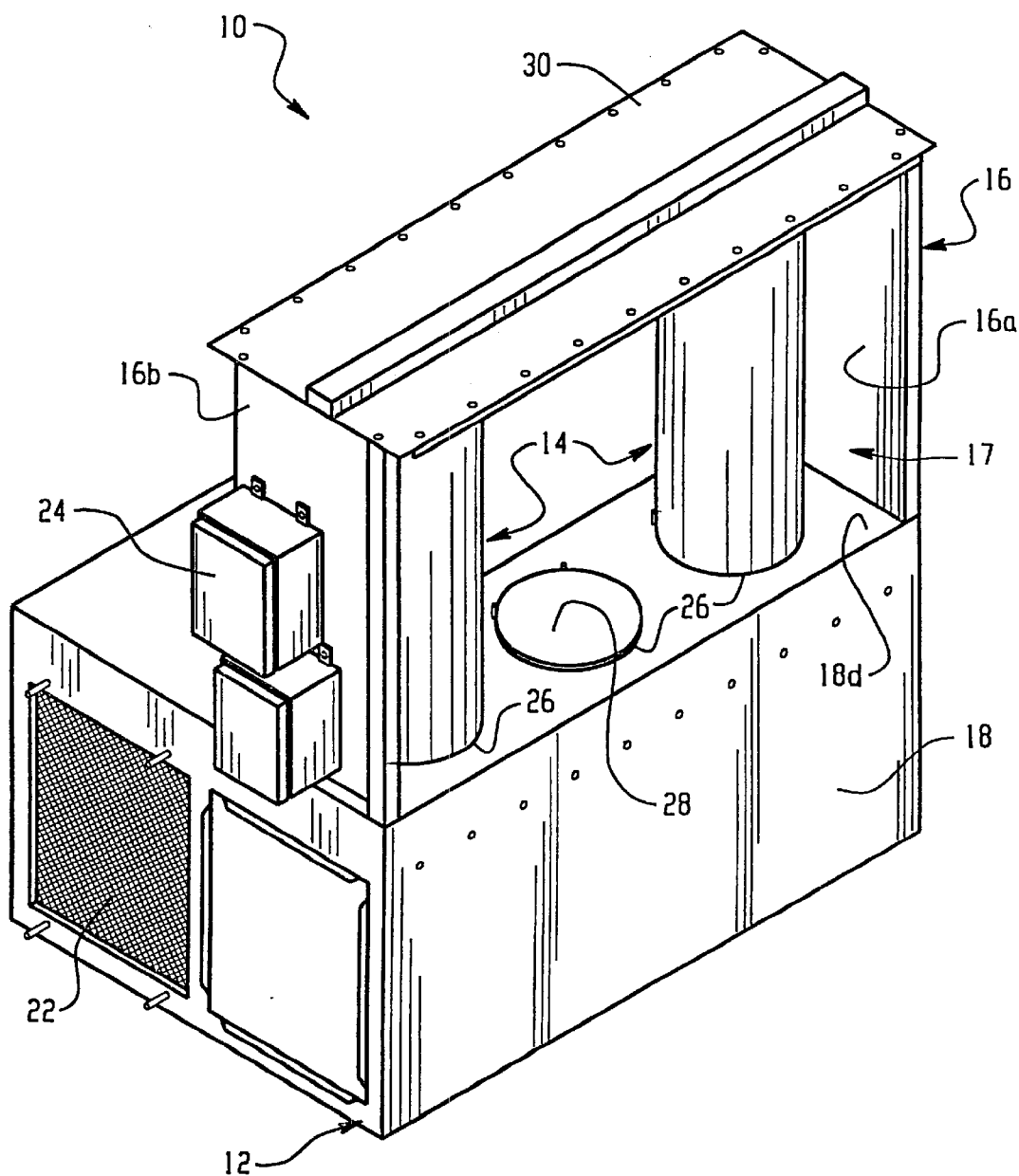
FIG. 1 is an isometric illustration of a modular powder recovery apparatus for a smaller size spray booth in accordance with the invention.

The basic modular powder recovery apparatus includes a base unit 12, one or more cartridge-style filters 14 and a wrapper 16. The wrapper 16 partly encloses the cartridges 14 and forms part of the spray booth structure when assembled thereto. Although cartridge-type filters are illustrated in the described embodiments, any filter arrangement may be used with the present invention as part of the modular apparatus 10.

Figure 6:
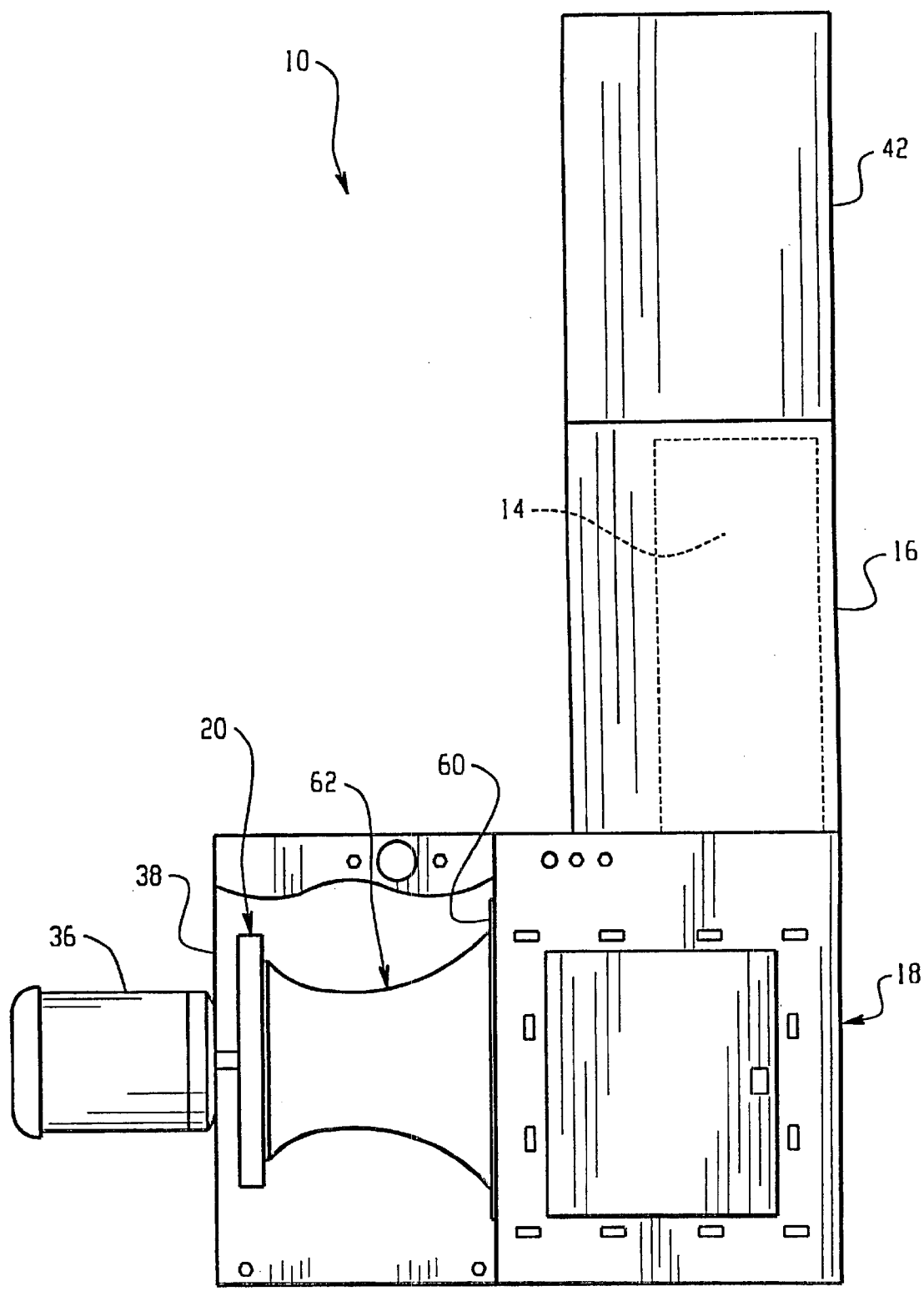
FIG. 6 illustrates a fan cone feature of the present invention.

The base unit 12 includes a housing 18 that encloses a motor driven fan wheel 20 (see FIG. 6). The fan wheel 20 draws air from the spray booth into the cartridge filters 14 and down into the interior of the base housing 18. The powder-laden air is primarily filtered by the cartridge filters 14, but one or more secondary or final filters 22 may be used to filter the air prior to exhausting the air to the plant. An electric control box 24 may be provided for an on/of switch, circuit breaker and so forth in a conventional manner.

In the embodiment of FIG. 1, the base housing 18 has a series of three openings 26 that may receive and support a respective vertically aligned cartridge filter 14. In this example, only two of the three filter opening 26 are used, with the third being covered by a cover plate 28. The number of filters 14 actually used will be determined by the air flow required to contain the powder in the booth and the amount of overspray that is typically incurred for a particular spraying operation.

Figure 3:
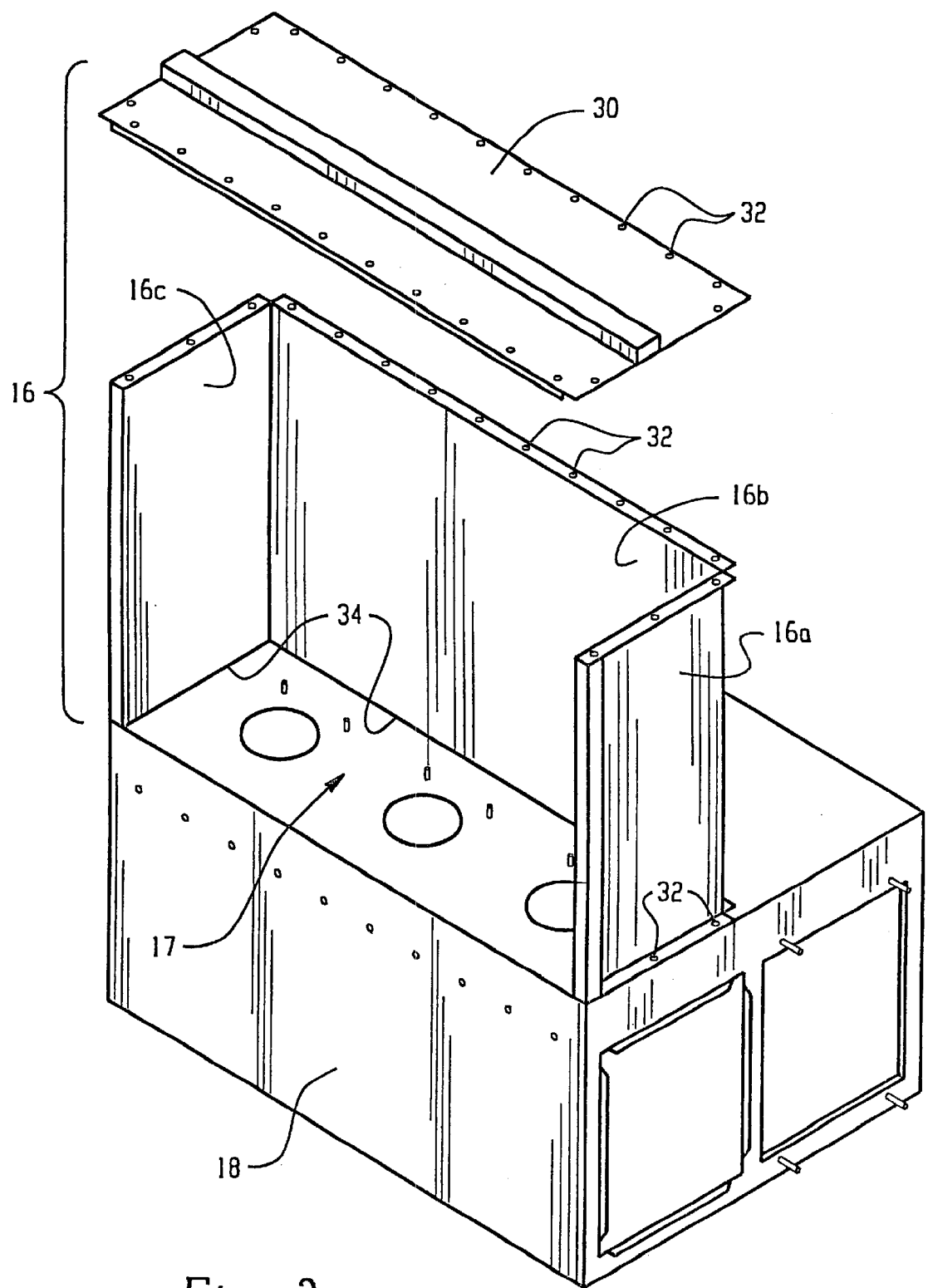
FIG. 3 is a partially exploded view of the apparatus of FIG. 1 with the filters omitted.

FIG. 3 is a partially exploded view of the apparatus of FIG. 1 with the cartridge filters removed for clarity to illustrate details of the wrapper 16. The wrapper 16 is used to partially enclose the filters 14, and in effect form a filter bay 17 that is part of the spray booth enclosure when the apparatus 10 is mounted to a spray booth. The wrapper 16 is made of any suitable material such as stainless steel, galvanized steel, other suitable metals, as well as non-metallic material such as, for example, polypropylene.

The wrapper 16 in the illustrated embodiment is a three walled structure 16a, 16b and 16c, with a removable top 30. A series of bolt holes 32 are provided along the various perimeters so that the wrapper 16 can be securely mounted on top of the base housing 18, and the top 30 installed thereon (FIG. 1). In order to maximize airflow into the cartridge filters 14, the various joints 34 may be caulked or otherwise sealed. Any suitable technique may be used to install the wrapper 16 on the base housing 18.

Figure 4A:
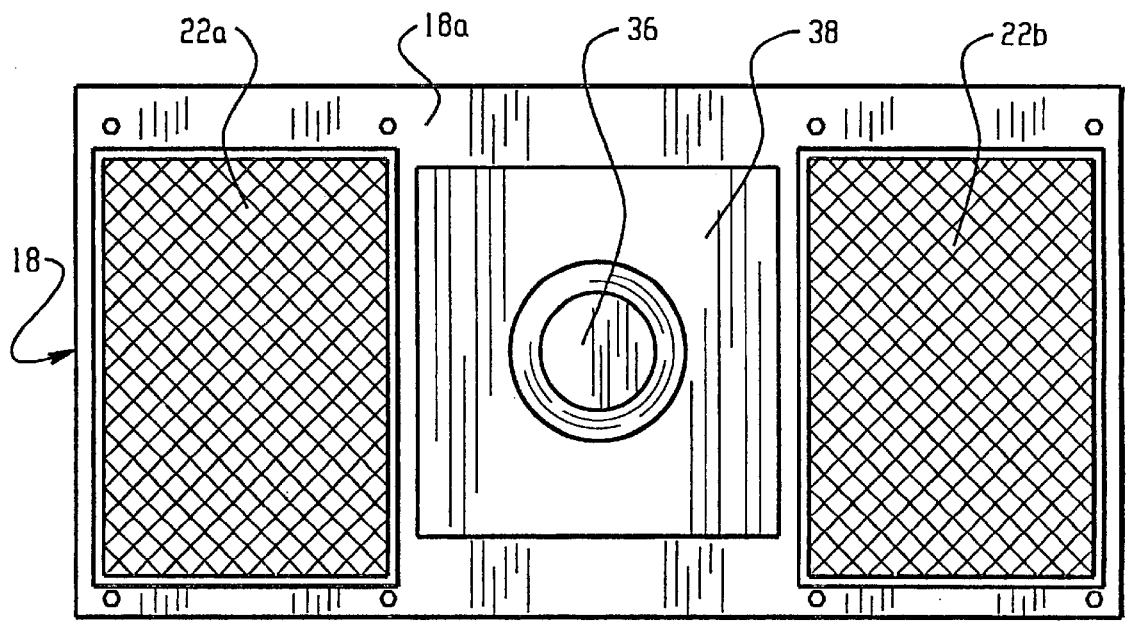
FIGS. 4A and 4B illustrate respectively rear and side views of a base unit for the apparatus of FIGS. 1 and 2.
Figure 4B:
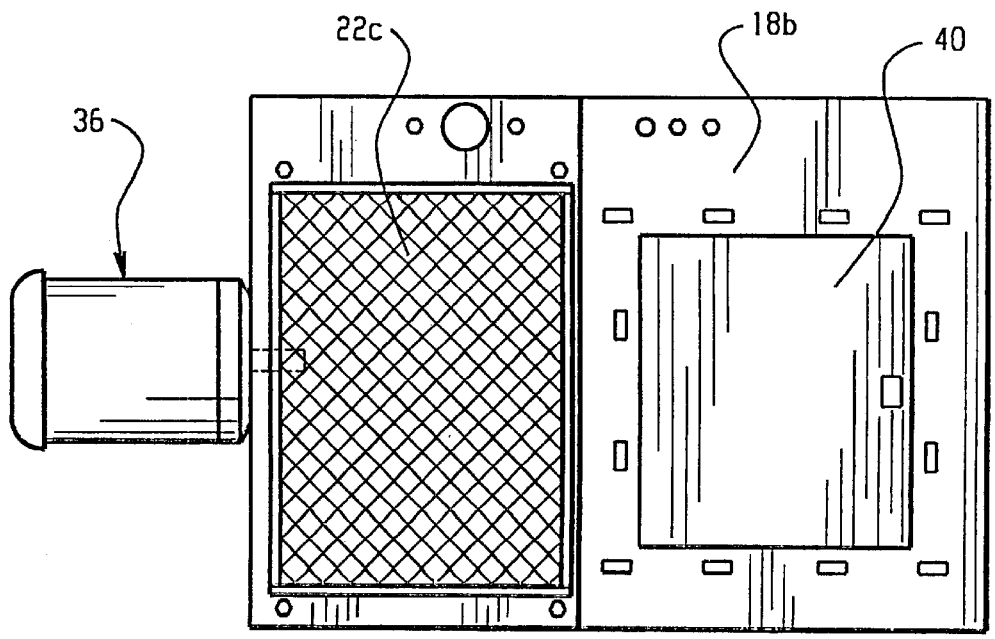

FIGS. 4A and 4B illustrate a typical and exemplary configuration of the final filters 22 and the fan motor 36. In FIGS. 4A and 4B the wrapper 16 and cartridges 14 are omitted for clarity. In the illustrated embodiment, the motor 36 and the driven fan wheel 20 and a fan cone 62 (see below) are separate devices, however, alternatively the motor 36 may be integrally assembled with the fan wheel 20. The motor 36 is centrally mounted with a support panel 38 that can accommodate different sized motors as required. Final filters 22a and 22b are installed on the back panel 18A of the base housing 18. If a particular final filter location need not be used, the filter can be replaced with a cover panel 40. Another final filter 22C is installed on side panel 18b, and the same may be done on the opposite side panel as required (not shown).

Figure 2:
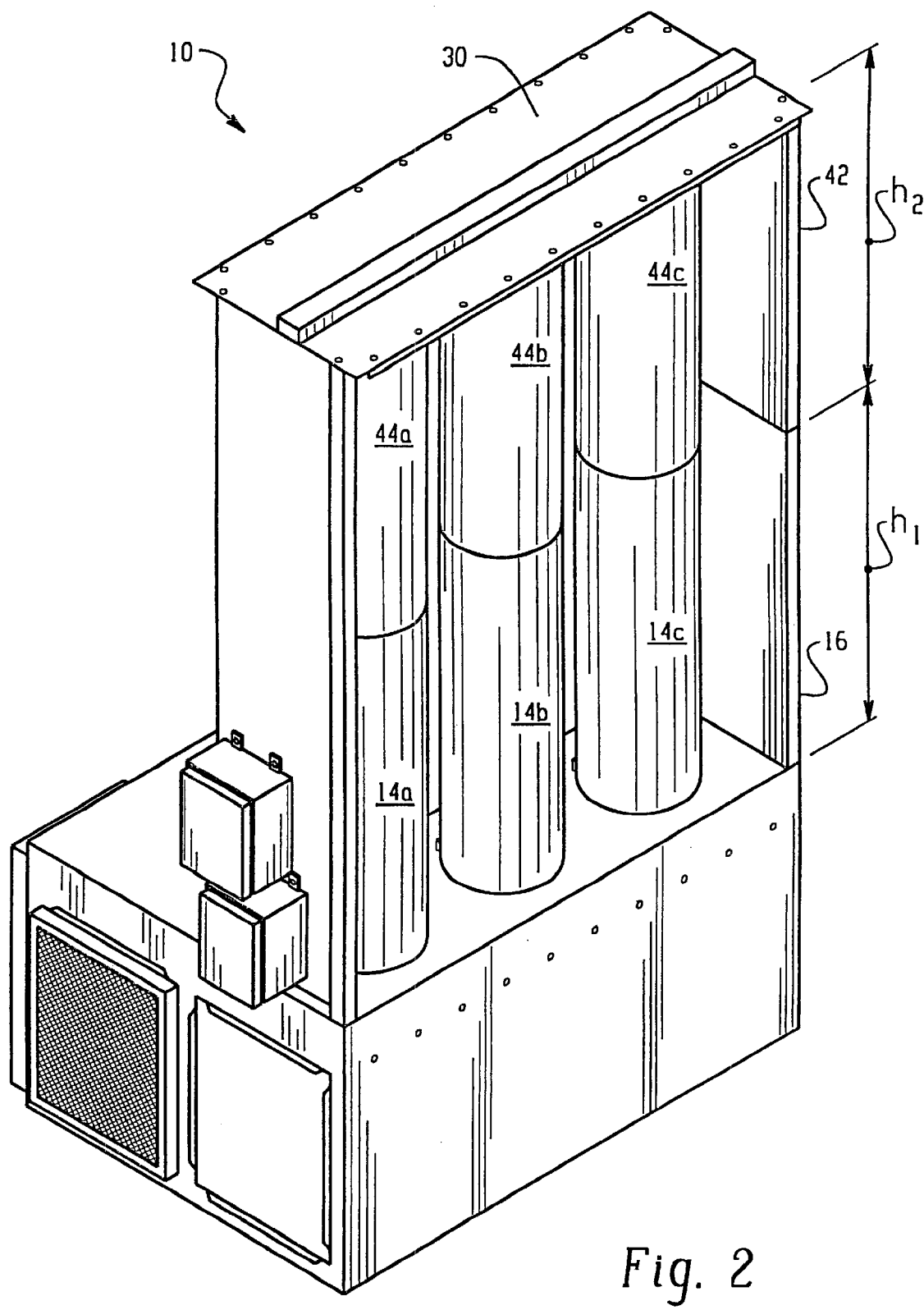
FIG. 2 is an isometric illustration of the apparatus of FIG. 1 modified to accommodate higher air flow and powder filtering using the same base housing.

With reference to FIG. 2, the powder recovery apparatus 10 has been modified to now accommodate a larger number and size of cartridge filters 14. In this example, a second wrapper 42 that generally conforms to the first wrapper 16, has been vertically stacked on top of the first wrapper 16. If the first wrapper 16 has a vertical height h, and the second wrapper has a vertical height $h_2$, the overall assembly can now accommodate a filter stack that has a height of about $h_1$ plus $h_2$. In this example of FIG. 2, this is easily realized by simply stacking additional cartridge filters 44a, 44b, 44c vertically on top of the original filters 14a, 14b and 14c (note that in FIG. 2 the third filter opening 26 is being used compared with FIG. 1). The same cover 30 can then be used to complete the assembly and hold the filters 14, 44 in place.

The relative heights $h_1$ and $h_2$ need not be the same. The second wrapper 42 need simply to conform to the upper perimeter of the first wrapper 16 so that the wrappers 42, 16 may be secured together as by bolts using the bolt holes 32. Again, any suitable way to connect the wrappers together may be used. All joints are preferably caulked or otherwise suitably sealed.

A comparison of FIGS. 1 and 2 illustrate the modular concept of the present invention. Using the same base unit 12, the filtering capacity of the apparatus 10 can easily be increased by simply adding more wrappers to increase the vertical height of the overall filter bay 17. The only assembly needed is to remove the top cover 30, stack the second wrapper 42 on top of the first wrapper 16, install the additional filters 14 as required and then re-install the top cover 30. No modification to the base housing 18 is needed. However, in the event that there is a need to increase the air flow into the base unit 12, for example, due to an increase in the spray booth size, the motor 36 and fan wheel 20 and fan cone 62 may be changed as required, as well as the use of additional final filters 22.

While FIG. 2 illustrates two wrappers and sets of vertically stacked filters, additional levels may be added as required.

Figure 5:
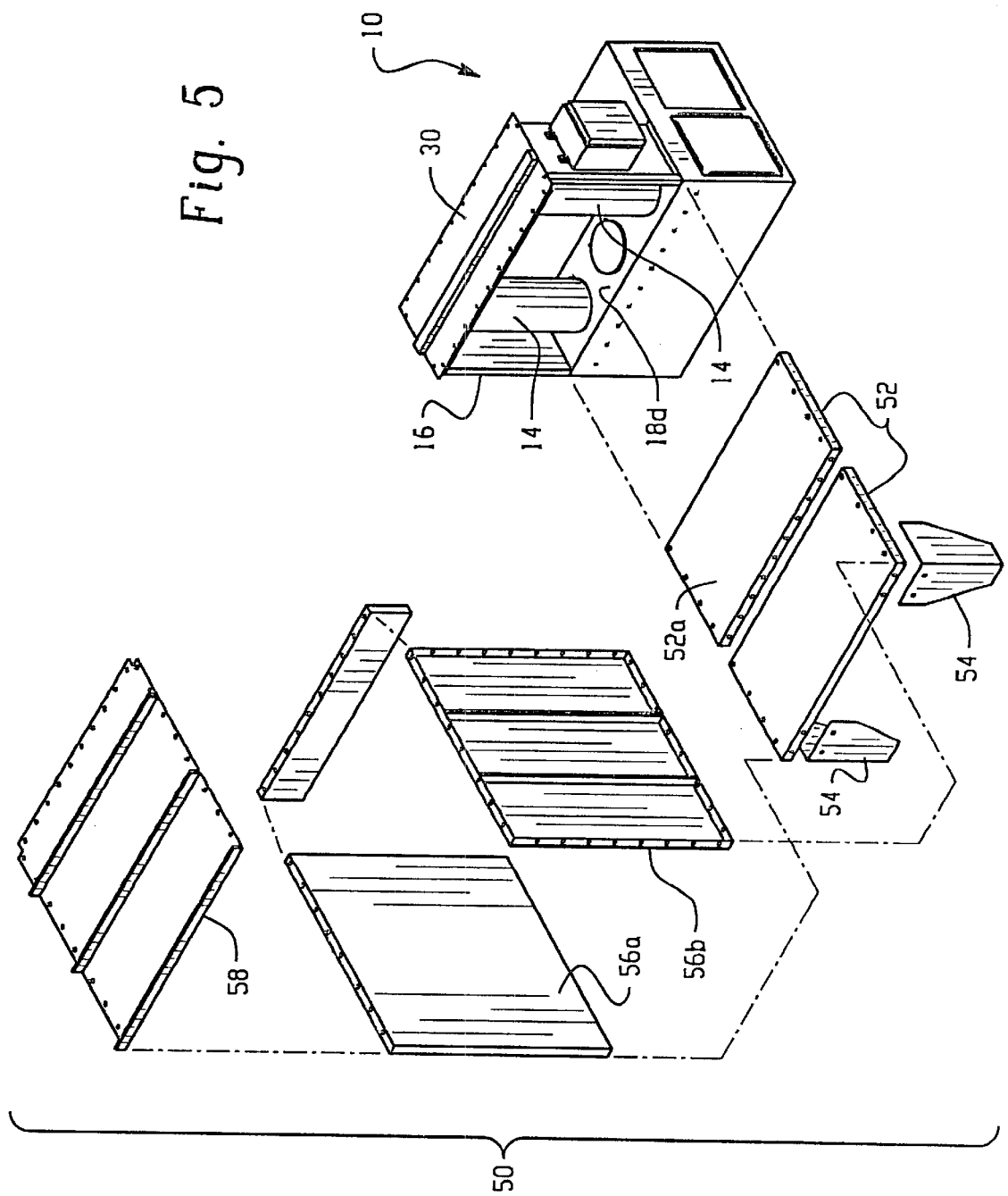
FIG. 5 is an exploded view of a spray booth used with the modular powder recovery apparatus of FIG. 1.

The spray booth 50 may be conventional in design and is illustrated in an exploded view in FIG. 5. The booth 50 typically includes a floor 52 attached on one side to the modular powder recovery apparatus 10 and supported on an opposite side by legs 54. Walls 56a, b and top 58 form a partially enclosed spray booth 50. Preferably the plane of the floor 52 upper surface 52a, is generally flush with the top portion 18d of the base housing 18. As is well known, the cartridges 14 may be cleaned by applying a reverse pulse of air through the cartridges 14 which knocks the powder to the floor 52 for collection and removal. Many different spray booth configurations may be used. The amount of air that must be drawn from the spray booth in order to contain and recover the powder overspray will determine the motor, fan, fan cone and filter sizes and quantities needed for a particular booth.

With reference to FIG. 6, and additional feature of the invention is illustrated. As the spray booth dimensions increase, for example, a larger motor 36 and fan wheel 20 may be required to pull the necessary airflow into the recovery system 10. In FIG. 6, the motor 36 drives the fan wheel 20. Heretofore, the fan wheel 20 would pull air through an inlet 60 to draw air from the spray booth through the cartridges 14, down through the opening 26 in the base housing 18 and into the base unit 12 interior. However, each time the fan wheel size changed, the base 12 had to be modified to accommodate the different airflow and also to mount the fan wheel 20 at the inlet. In order to increase the modularity of the base unit 12, a fan cone 62 is provided between the fan wheel 20 and the inlet 60. The fan cone 62 provides a standard interface between the fan wheel and the inlet 60. In other words, a standard inlet opening 60 may be used for a number of different sized fan wheels 20, simply by changing the fan cone 62. No other structural modification of the base 12 is required, and the cone 62 is easily accessible through the back end plate 38 of the base unit 12. These skilled in the art will readily appreciate that the fan cone 62 is an option that can be used in any powder recovery apparatus, with or without the other modular features of the present invention.

Figure 7:
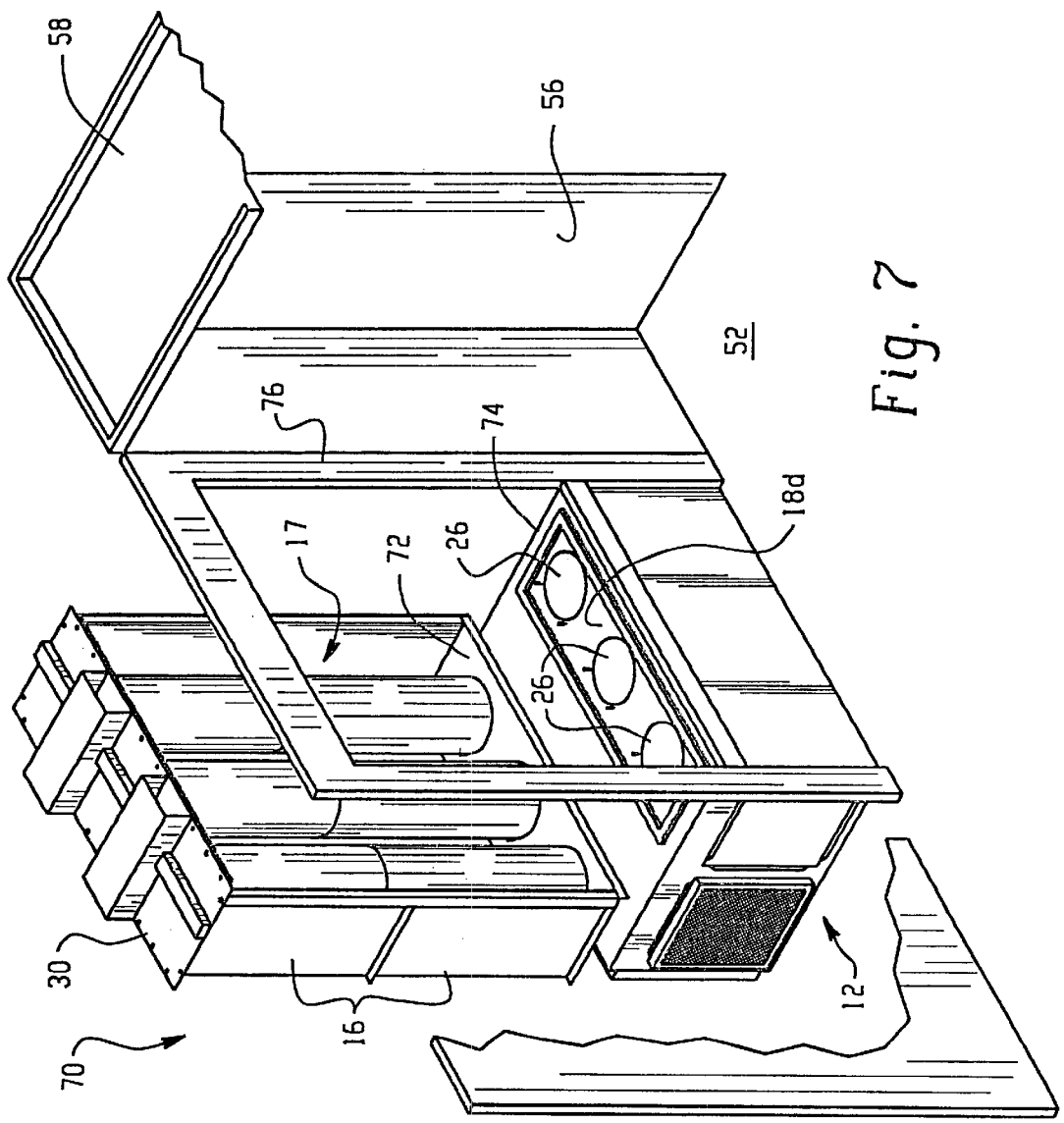
FIG. 7 illustrates an additional alternative modular feature of the invention for faster color change operations.

With reference to FIG. 7, in order to more easily facilitate color change operations, a modular cartridge assembly 70 includes one or more vertically aligned wrappers 16 as in the previous embodiments. However, the wrappers 16 and cartridges 14 are assembled together as a separable unit 70. Thus, a cover 30 and a bottom plate 72 cooperate with the wrappers 16 to form a box-like structure that supports the cartridges 14 therein. The assembly 70 can then be installed on and removed from the same base unit 12 as described hereinbefore. By being able to remove and replace the entire cartridge assembly 70 as a single unit, color changeover is greatly simplified with less problems of contamination between colors.

Because the modular color cartridge assembly 70 is intended to be an interchangeable unit, a gasket 74 is provided between the bottom plate 72 and the upper surface 18d of the base housing 18. Any other suitable seal technique may be used as required. All other joints in the assembly 70 may be caulked or sealed as previously described.

FIG. 7 also partially illustrates the spray booth 50. From FIG. 7 it is apparent how the filter bay 17 forms an integral part of the spray booth 50 when the two structures are assembled so as to contain and filter the powder overspray generated in the booth. A mouth plate 76 is provided to provide a structural support and smooth transition between the powder recovery apparatus 10 and the spray booth 50 interior. The floor 52 may be installed generally flush with cthe housing surface 18d (FIG. 5) or below as in FIG. 7, or other suitable relative position as required to facility powder recovery.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

Having thus described the invention, it is claimed:

1. A filter cartridge module for use with a powder spray booth, comprising:

a housing for supporting one or more filter cartridges thereon;

a fan wheel disposed in said housing to draw air into said housing through said one or more filter cartridges;

a motor mounted on said housing to drive said fan wheel; and a fan cone disposed between said fan wheel and an inlet to said housing from said one or more filter cartridges; said fan cone permitting motor and fan wheel size changes independent of changing said inlet or housing.

2. The assembly of claim 1 wherein said fan cone provides a predetermined size interface at said inlet for different fan wheel sizes.

3. The assembly of claim 1 wherein said fan wheel size and said motor size can be changed with a corresponding change in said fan cone without changing size of said inlet or size of said housing.

* * * * *